US012699916B2

(12) United States Patent
Ahmad et al.

(10) Patent No.: US 12,699,916 B2
(45) Date of Patent: Aug. 4, 2026

(54) MACHINE LEARNING MODEL TRAINING CHECKPOINTS

(71) Applicant: Apple Inc., Cupertino, CA (US)

(72) Inventors: Suhail Ahmad, Cupertino, CA (US); Alexander B. Brown, Mountain View, CA (US); Elizabeth A. Ottens, San Francisco, CA (US); Alejandro Isaza, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1126 days.

(21) Appl. No.: 17/334,679

(22) Filed: May 28, 2021

(65) Prior Publication Data

US 2021/0398020 A1     Dec. 23, 2021

Related U.S. Application Data

(60) Provisional application No. 63/041,747, filed on Jun. 19, 2020.

(51) Int. Cl.
*G06N 20/00* (2019.01)
*G06F 8/71* (2018.01)
*G06F 11/1471* (2026.01)

(52) U.S. Cl.
CPC .............. *G06N 20/00* (2019.01); *G06F 8/71* (2013.01); *G06F 11/1471* (2013.01)

(58) Field of Classification Search
CPC ........ G06N 20/00; G06F 8/71; G06F 11/1471
See application file for complete search history.

(56) References Cited

U.S. PATENT DOCUMENTS

| | | | | |
|---|---|---|---|---|
| 11,295,165 | B1 * | 4/2022 | Agarwal | G06F 18/2413 |
| 11,537,506 | B1 * | 12/2022 | Dasgupta | G06F 11/1476 |
| 2018/0025286 | A1 * | 1/2018 | Gorelik | G06F 30/20 |
| | | | | 706/12 |
| 2018/0089593 | A1 | 3/2018 | Patel et al. | |
| 2019/0114537 | A1 | 4/2019 | Wesolowski et al. | |
| 2019/0324856 | A1 * | 10/2019 | Zhao | G06F 18/2148 |
| 2020/0327412 | A1 * | 10/2020 | McCourt | G06N 20/20 |
| 2020/0387829 | A1 * | 12/2020 | Kearney | G16H 50/70 |
| 2021/0049500 | A1 * | 2/2021 | Dodds | G06N 20/00 |
| 2021/0060768 | A1 * | 3/2021 | Nitta | G06N 5/04 |

OTHER PUBLICATIONS

Rojas et al., "A Study of Checkpointing in Large Scale Training of Deep Neural Networks" 2020 International Conference on High Performance Computing & Simulation (HPCS20) (Year: 2012).*
Stack Overflow, "Tensorflow: save the model with smallest validation error," https://stackoverflow.com/questions/39252901/tensorflow-save-the-model-with-smallest-validation-error (Year: 2016).*

(Continued)

*Primary Examiner* — James T Tsai
(74) *Attorney, Agent, or Firm* — BAKERHOSTETLER

(57) ABSTRACT

A training operation for training a machine learning model may be initiated. At a predetermined checkpoint during the training operation, checkpoint information comprising a representation of the machine learning model in a partially trained state may be generated and stored in a non-volatile storage medium. The training operation for training the machine learning model may be continued after the predetermined checkpoint.

23 Claims, 5 Drawing Sheets

(56) References Cited

OTHER PUBLICATIONS

Garima et al., "Estimating Training Data Influence by Tracking Gradient Descent," available at <URL=https://arxiv.org/pdf/2002.08484v1>, Feb. 19, 2020 (Year: 2020).*

Anonymous, "Machine learning," Wikipedia, Jun. 18, 2020, retrieved from https://en.wikipedia.org/w/index.php?title=Machine_learning &oldid=963157682, retrieved on Sep. 22, 2021, 24 pages.

Anonymous, "TensorFlow," Wikipedia, Jun. 4, 2020, retrieved from https://en.wikipedia.org/w/index.php?title=TensorFlow&oldid=960708609, retrieved on Sep. 22, 2021, 7 pages.

Anonymous, "Version control," Wikipedia, Jun. 15, 2020, retrieved from https://en.wikipedia.org/w/index.php?title=Version_control &oldid-962750267, retrieved on Sep. 22, 2021, 10 pages.

Li et al., "A Generalized Framework for Population Based Training," Arxiv.org, Cornell University Library, Feb. 5, 2019, 9 pages.

International Search Report and Written Opinion from PCT/US2021/035963, dated Oct. 5, 2021, 15 pages.

Brownlee, "How to Check-Point Deep Learning Models in Keras," Jun. 16, 2016, retrieved from https://web.archive.org/web/20170711052811/https:/machinelearningmastery.com/check-point-deep-learning-models-keras/, 17 pages.

Github, "TensorFlow," Dec. 2019, retrieved from https://web.archive.org/web/20191217143025/https://github.com/tensorflow/tensorflow/blob/master/RELEASE.md, 103 pages.

Anonymous, "Checkpointing Models," Jun. 2018, retrieved from https://web.archive.org/web/20180621133516/https:/docs.h2o.ai/h2o/latest-stable/h2o-docs/checkpointing-models.html, 12 pages.

Gupta, "Train your Deep Learning Faster: FreezeOut," Aug. 3, 2017, retrieved from https://www.kdnuggets.com/2017/08/train-deep-learning-faster-freezeout.html, 4 pages.

Chinese Patent Application No. 202110679592.4; Third Office Action dated Apr. 2, 2026, 22 pages with machine translation.

* cited by examiner

100

110

140

120

NETWORK

130

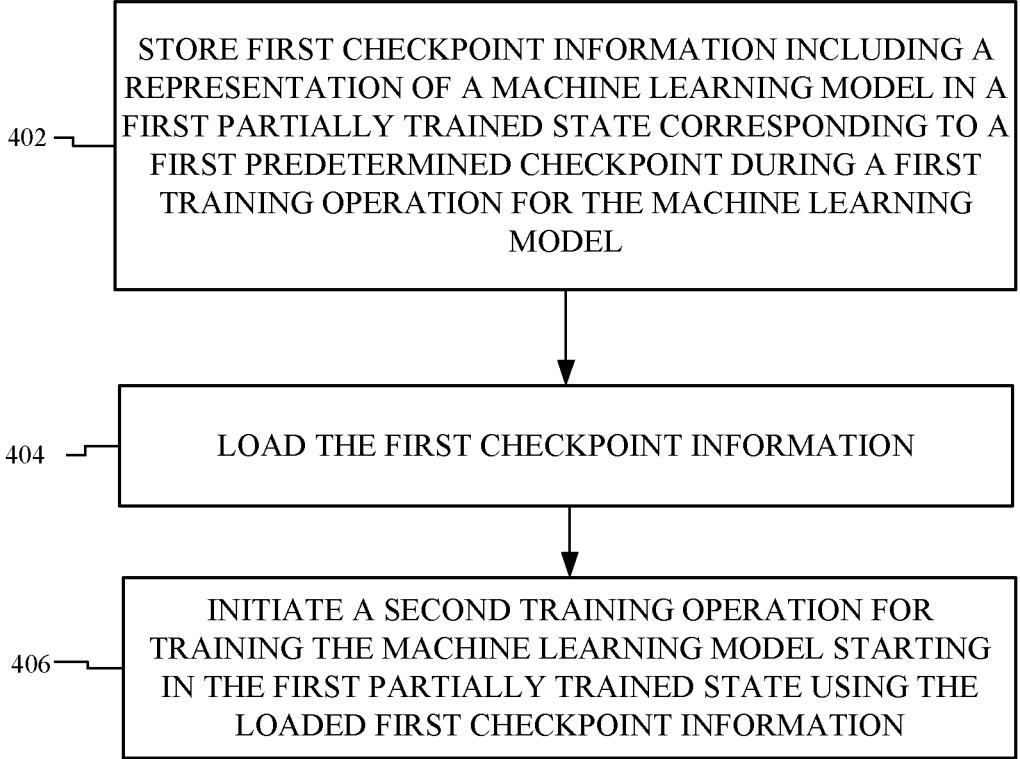

402 — STORE FIRST CHECKPOINT INFORMATION INCLUDING A REPRESENTATION OF A MACHINE LEARNING MODEL IN A FIRST PARTIALLY TRAINED STATE CORRESPONDING TO A FIRST PREDETERMINED CHECKPOINT DURING A FIRST TRAINING OPERATION FOR THE MACHINE LEARNING MODEL

404 — LOAD THE FIRST CHECKPOINT INFORMATION

406 — INITIATE A SECOND TRAINING OPERATION FOR TRAINING THE MACHINE LEARNING MODEL STARTING IN THE FIRST PARTIALLY TRAINED STATE USING THE LOADED FIRST CHECKPOINT INFORMATION

*FIG. 4*

MACHINE LEARNING MODEL TRAINING CHECKPOINTS

CROSS REFERENCE TO RELATED APPLICATIONS

This application claims the benefit of U.S. Provisional Patent Application No. 63/041,747, entitled "Machine Learning Model Training Checkpoints," filed on Jun. 19, 2020, the disclosure of which is hereby incorporated herein in its entirety.

TECHNICAL FIELD

The present description generally relates to machine learning and more particularly to training machine learning models.

BACKGROUND

Machine learning tools are developed and applied in a wide variety of fields. Increasing accessibility to both data and processing power enables sophisticated machine learning models to be created and trained. However, training operations for machine learning models often involve large numbers of iterations that may require hours or even days to complete.

BRIEF DESCRIPTION OF THE DRAWINGS

Certain features of the subject technology are set forth in the appended claims. However, for the purpose of explanation, several aspects of the subject technology are set forth in the following figures.

FIG. 4 is a flowchart illustrating resuming a training process for training a machine learning model according to aspects of the subject technology.

DETAILED DESCRIPTION

Figure 1:
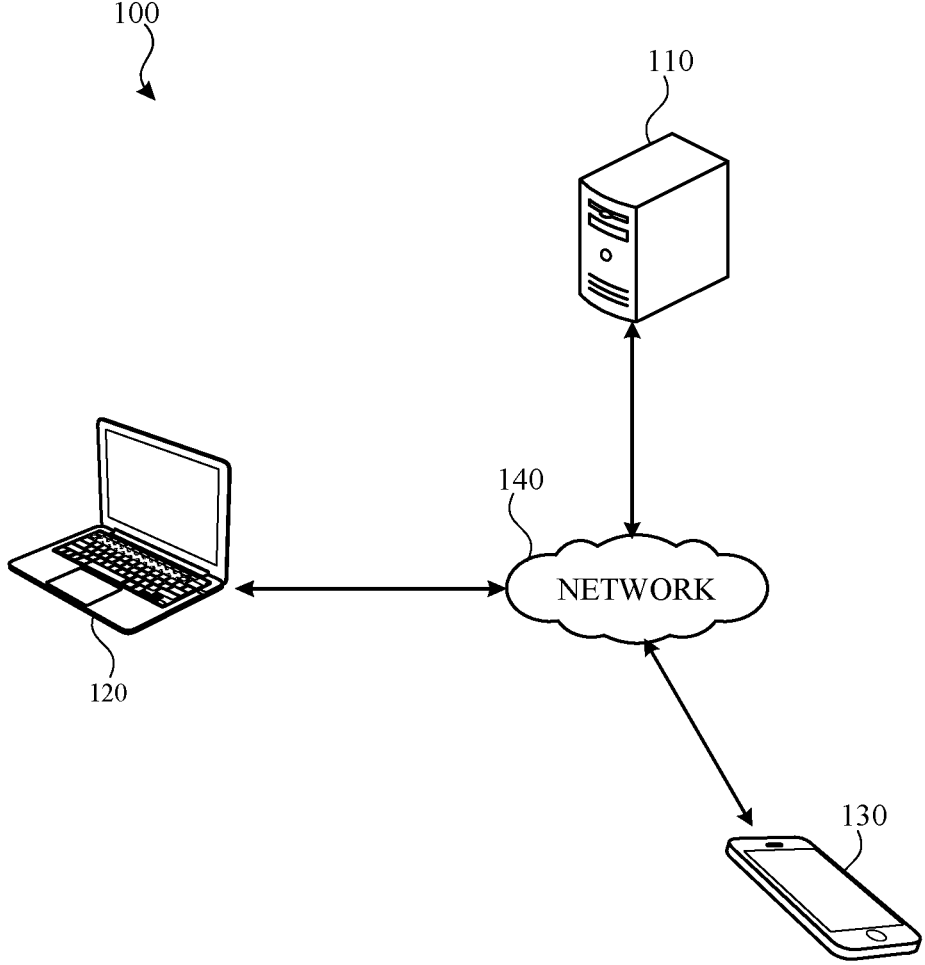
FIG. 1 illustrates an example network environment according to aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject technology provides a training platform for machine learning models that utilizes checkpoints set at different stages or milestones reached during training operations. A training operation including one or more checkpoints may be initiated to perform a set number of training iterations to train a selected machine learning model using selected training data. At each checkpoint during the training operation, the training platform may be configured to capture a representation of the machine learning model in a partially trained state achieved during the training operation up to the checkpoint. Checkpoint information, including the representation, may be generated at each checkpoint during the training operation and stored to disk.

The checkpoint information generated at each checkpoint includes information that may be used to resume a training operation for a machine learning model starting from the portion of the training operation that follows the checkpoint. The training operation may be resumed without repeating the training iterations that were previously performed up to the checkpoint in the training operation. The checkpoint information may include feature vectors containing data extracted from the training data, thereby allowing the training operation to be resumed without re-processing the training data to generate the feature vectors. Alternatively, the training data may be supplemented or replaced with new training data for the resumption of the training operation.

The checkpoint information generated at each checkpoint also may be used to generate an operational machine learning model in the partially trained state achieved during the training operation up to the checkpoint. An operational machine learning model allows the training operation to be evaluated at the stage of the checkpoint. The evaluation may include passing new data not included in the training data as input data through the operational machine learning model to evaluate the performance of the training operation.

According to aspects of the subject technology, a first training operation for training a machine learning model may be initiated. At a first predetermined checkpoint during the first training operation, first checkpoint information comprising a representation of the machine learning model in a first partially trained state may be generated and stored in a non-volatile storage medium. The first training operation for training the machine learning model may be continued after the first predetermined checkpoint. The first training operation may include a first number of training iterations, and the first predetermined checkpoint may be set at a point after a second number of training iterations has been completed, where the second number of training iterations is less than the first number of training iterations.

The first checkpoint information may be loaded from the non-volatile storage medium and a second training operation for training the machine learning model starting in the first partially trained state may be initiated using the stored first checkpoint information. The second training operation may include the training iterations remaining from the first number of training iterations after the second number of training iterations are completed. At a second predetermined checkpoint during the second training operation, second checkpoint information including a representation of the machine learning model in a second partially trained state may be generated and stored in the non-volatile storage medium. The second training operation for training the machine learning model may be continued after the second predetermined checkpoint.

The first training operation for training the machine learning model uses a first set of training data and the second training operation for training the machine learning model may use a second set of training data that is different from the first set of training data. The first checkpoint information may include loss values for the first set of training data determined in a last training iteration before the first predetermined checkpoint and the second checkpoint information may include loss values for the second set of training data determined in a last training iteration before the second predetermined checkpoint. The first checkpoint information also may include a representation (e.g., a matrix representation) of the machine learning model in the first partially trained state, feature vectors generated from training data used in the first training operation of the machine learning model, and a tensor comprising weight values of the machine learning model in the first partially trained state.

An operational machine learning model may be generated based on the first dataset. A user-selected set of data (e.g., labeled or unlabeled data) may be passed through the operational machine learning model to generate output data. The generated output data may be evaluated and stored in the non-volatile storage medium.

According to aspects of the subject technology a system is provided that includes a processor; and a memory device containing instructions which, when executed by the processor, cause the processor to store, in a non-volatile storage medium, first checkpoint information including a representation of a machine learning model in a first partially trained state corresponding to a first predetermined checkpoint during a first training operation for the machine learning model. The instructions, when executed by the processor, further cause the processor to load the first checkpoint information from the non-volatile storage medium, and initiate a second training operation for training the machine learning model starting in the first partially trained state using the loaded first checkpoint information.

Inserting checkpoints into a training operation to capture representations of a machine learning model in partially trained states during the training operation improves efficiencies in the development and training of machine learning models. The generated and stored checkpoint information for one or more checkpoints provides effective backup to the training operation in the event of power loss or system failure before the training operation has completed all of its training iterations, thereby enabling resumption of the training operation after power or the system has been restored without expending processing resources to repeat the previously completed training iterations up to the last completed checkpoint. The ability to evaluate the machine learning model at the different states of training corresponding to the checkpoints allows determinations of whether the partially trained state of the machine learning model may meet the satisfy the desired specifications for the model or whether training data might need to be updated before completing the training operation. The selection/curation of data may be evaluated and improved by comparing the performance of the machine learning model at different checkpoints and looking at the training data used between the checkpoints. These advantages may be achieved without requiring the entire training operation to be run and completed multiple times for the different scenarios being evaluated, thereby reducing the time and amount of processing resources used in developing machine learning models and curating training data.

FIG. 1 illustrates an example network environment 100 according to aspects of the subject technology. Not all of the depicted components may be used in all implementations, however, and one or more implementations may include additional or different components than those shown in the figure. Variations in the arrangement and type of the components may be made without departing from the scope of the claims as set forth herein. Additional components, different components, or fewer components may be provided.

The network environment 100 includes server 110, computing device 120, and computing device 130. Network 140 may communicatively (directly or indirectly) couple server 110 and computing devices 120 and 130. Network 140 is not limited to any particular type of network, network topology, or network media. Network 140 may be a local area network or a wide area network. Network 140 may be an interconnected network of devices that may include, or may be communicatively coupled to, the Internet. For explanatory purposes, the network environment 100 is illustrated in FIG. 1 as including the server 110 and the computing devices 120 and 130. However, the network environment 100 may include any number of electronic devices and any number of servers. Computing device 120 is depicted as a laptop computer and computing device 130 is depicted as a smartphone. The subject technology is not limited to these embodiments of computing devices. Server 110 and computing devices 120 and 130 may include all or part of the components of the system described below with respect to FIG. 4.

Server 110 may provide a training platform for training machine learning models according to the techniques described herein. The training platform on server 110 may be accessed directly on server 110 or through a client executing on computing device 120 or 130. Alternatively, the training platform may be provided on computing device 120 and the checkpoint information may be stored in non-volatile storage media either on computing device 120 or transferred for storage on server 110 via network 140 or through other transfer mechanisms. The trained machine learning models may be stored deployed for use on any of server 110, computing device 120, or computing device 130.

Figure 2:
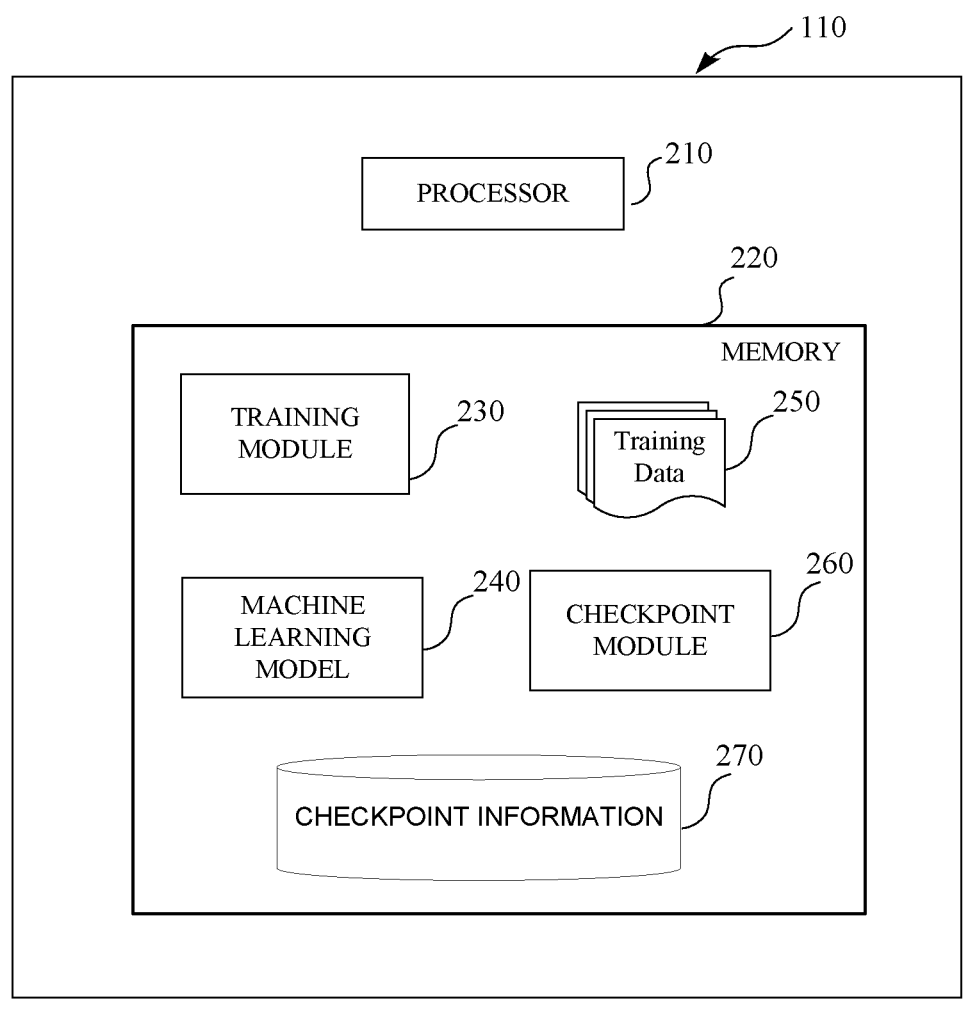
FIG. 2 illustrates an example computing architecture for a system providing a training platform for training machine learning models according to aspects of the subject technology.

FIG. 2 is a block diagram illustrating components of server 110 used in implementing the training platform described herein according to aspects of the subject technology. While the components are being described as being part of server 110, some or all of the components may be implemented on other systems such as computing devices 120 or 130. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, server 110 includes processor 210 and memory 220. Examples of processor 210 and memory 220 are provided below in connection with FIG. 4. Memory 220 may contain training module 230, machine learning model 240, training data 250 checkpoint module 260, and checkpoint information repository 270.

Training module 230 represents code comprising one or more sequences of instructions executable by processor 210 to initialize and execute a training operation to train machine learning model 240 for example. Initialization of the training operation may include selection of machine learning model 240 and training data 250. Machine learning model 240 is not limited to any particular type of machine learning model, such as a neural network model for example. Machine learning model 240 may be selected from multiple machine learning models stored in memory 220 or accessed from another repository on another computing device via network

140. Training data 250 may be selected from a collection of training data available for training machine learning models. Training data 250 may include labeled data and may be divided into training data and validation data for use in the training operation.

Checkpoint module 260 represents code comprising one or more sequences of instructions executable by processor 210 to generate the checkpoint information during the training operation and provide other checkpoint operations described herein. The training operation may have one or more checkpoints set at different points during the operation. Upon reaching a checkpoint, training module 230 may signal checkpoint module 260 to generate checkpoint information capturing the machine learning model in a partially trained state achieved at the time of the checkpoint. Checkpoint module 260 may store the generated checkpoint information in repository 270.

As noted above, checkpoint information captures the machine learning model in a partially trained state that was achieved at the time of the checkpoint during the training operation. In general, checkpoint information includes information that may be used to resume the training operation following the set checkpoint and is computationally expensive to reproduce from the beginning of the training operation. In addition, the information in the checkpoint information may be used to generate an operational machine learning model partially trained up to the checkpoint in the training operation. The checkpoint information may include a matrix representing the machine learning model, an N-dimensional tensor containing weights and other parameters for the machine learning model in the partially trained state, and feature vectors containing information extracted from the training data for processing by the machine learning model. The checkpoint information is not limited to these examples and may include other types of information in addition to or in place of the foregoing examples.

In addition to initializing a training operation of an untrained machine learning model, training module 230 also may initialize a resumption of a training operation starting from a checkpoint set in the training operation where the training operation was either previously completed or interrupted (e.g., paused or cancelled) before completion. Training module 230 may provide access to a log of stored checkpoint information for a particular machine learning model for which the training operation was previously executed in whole or in part. The checkpoint information of interest may be selected and the training operation may be continued with the training data previously used or new training data may be selected to supplement or replace the previously used training data.

Figure 3:
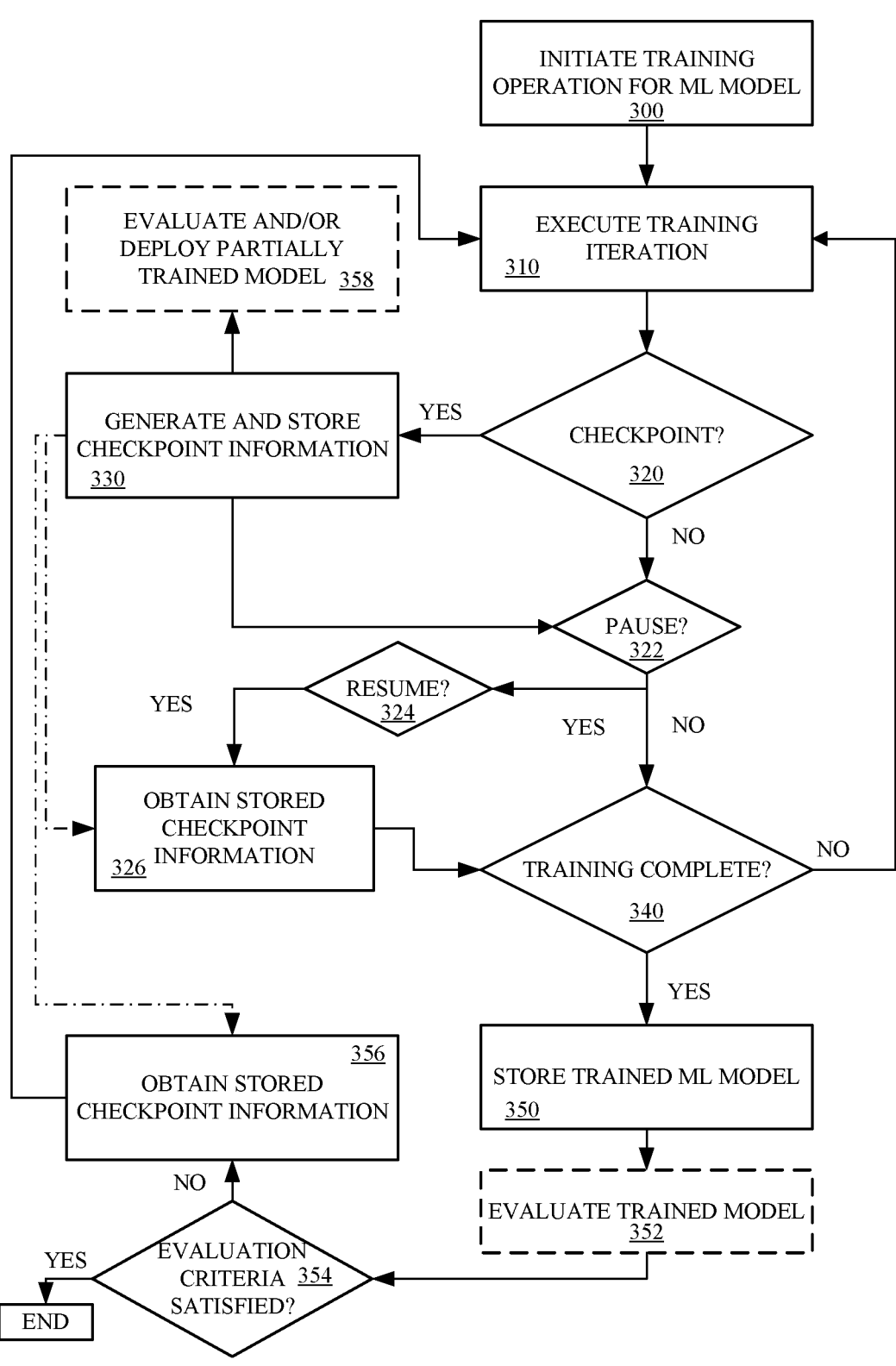
FIG. 3 is a flowchart illustrating a training process for training a machine learning model according to aspects of the subject technology.

FIG. 3 is a flowchart illustrating a training operation for training a machine learning model according to aspects of the subject technology. For explanatory purposes, the blocks of the process are described herein as occurring in serial, or linearly. However, multiple blocks of the process may occur in parallel. In addition, the blocks of the process need not be performed in the order shown and/or one or more blocks of the process need not be performed and/or can be replaced by other operations.

As indicated above, a training operation may be initialized by selecting a machine learning model for training and selecting training data for use during the training operation (block 300). The training operation may include a number of training iterations that are executed (block 310). Each training iteration may include a forward pass of the training data through the machine learning model, a determination of a loss function, and a backwards pass through the machine learning model to update the weights and parameters of the machine learning model based on the loss function.

After each training iteration, training module 230 may determine if a checkpoint has been reached (block 320). The checkpoints may be set prior to the start of the training operation. The training operation may include one or multiple checkpoints. The checkpoints may be evenly distributed throughout the during of the training operation, such as at every 1,000 training iterations of a total 10,000 training iterations to be executed during the training operation. The checkpoints may be set at other intervals that may reflect different milestones in the training operation, such as at 50% completion, 75% completion, 90% completion, and 95% completion. Other milestones based on performance of the machine learning model during training such as changes in a loss function or another metric measured during the training operation may be used to indicate a checkpoint. The checkpoints may be predetermined in the programming or settings in training module 230 or may be user-specified prior to initiating a training operation. The foregoing number of checkpoints and spacing during the training operation represent examples and do not limit the number and spacing of checkpoints according to the subject technology.

If a checkpoint has been reached (block 320), checkpoint information for that checkpoint is generated and stored (block 330). The checkpoint information may be stored in non-volatile storage media or memory, such as in the examples described below, to protect the training of the machine learning model that has been completed up to the checkpoint in case of power loss or system failure, or in case of a user pause or cancellation of the training operation. The checkpoint information for each checkpoint may be stored, for example, in a log format containing the checkpoint information for all of the checkpoints as a record of the training process.

As illustrated in FIG. 3, after or in parallel with generating and storing the checkpoint information, the training operation may be paused or cancelled (block 322). In the example of FIG. 4, the pausing or cancelling of the training operation is illustrated as occurring after or in parallel with generating and storing the checkpoint information. However, this is merely illustrative. Because the checkpoint information is stored at each checkpoint, the training operation can be paused, cancelled, or otherwise interrupted at any point and can be resumed using the checkpoint information for the last or any prior checkpoint.

As illustrated in FIG. 3, after the training operation has been paused (or otherwise interrupted) at block 322, the training process can be resumed (block 324). As shown, when the training process is resumed, the stored checkpoint information from the last (or any prior) checkpoint may be obtained (block 326) (e.g., from database 270). Obtaining the stored checkpoint information may include loading the configuration of the model in the partially trained state corresponding to the checkpoint information into a model architecture for further training iterations and/or operations. Obtaining the stored checkpoint information for resuming the training operations may include verification of checkpoint validity with persisted training parameters, and state loading using the stored checkpoint information, prior to executing a new training iteration at block 310.

After or in parallel with obtaining the stored checkpoint information (following a pause or interruption) and/or after or in parallel with determining whether a checkpoint as been reached (e.g., if no pause or interruption has occurred), it is determined whether training of the mode is complete (e.g., whether training iterations of an initially specified number of training iterations remain in the current training operation, or whether the loss function indicates that the training has achieved an initial accuracy goal for the current training operation) (block 340). If the training is not complete, the next training iteration is executed (block 310). If training is complete (e.g., if no training iterations remain, or if the desired accuracy has been achieved), the training process concludes and the trained machine learning model is stored (e.g., for deployment and/or future use) (block 350).

As illustrated in FIG. 3, in one or more implementations, the trained ML model may optionally be evaluated (block 352) even after the initial training criteria have been met to generate a trained ML model at block 350. For example, evaluating the trained ML model at block 352 may include providing additional data (e.g., evaluation data) to the trained ML model to generate an evaluation output, and comparing the evaluation output to a desired evaluation output (e.g., using a qualitative or quantitative evaluation criteria, such as an evaluation of whether there is more time for further training operations, whether a mathematical accuracy has been reached, or based on a qualitative determination of whether the initial completion criteria applied at block 340 produces a model that generates acceptable output).

If, at block 354, the evaluation criteria is satisfied, the process may end with the completed trained ML model stored at block 350. If, at block 354, the evaluation criteria is not satisfied, stored checkpoint information associated with the last checkpoint of the training operation (e.g., including loss information, and/or configuration or state information for the last checkpoint) can be obtained (block 356), and additional training iterations may be performed (block 310). For example, the operations blocks 310, 320, 322, 324, 326, 340, 330, and/or 350 can be repeated for an additional set of training iterations and/or until an updated completion criteria for the training is satisfied. Because the checkpoint information is stored for each checkpoint, the additional set of training iterations can be performed, starting from the configuration of the model in the last training iteration.

FIG. 3 illustrates how, in one or more operational scenarios, training a machine learning model may include generating and storing (block 330) checkpoint information at a plurality predetermined checkpoints during a first training operation, completing (block 340) the first training operation (e.g., by completing a predetermined number of training iterations or achieving a predetermined accuracy), performing (block 352) an evaluation of a trained machine learning model generated by the completion of the first training operation, obtaining (block 356), based on the evaluation, the checkpoint information generated at a last one of the plurality of additional predetermined checkpoints, and performing (e.g., blocks 310, 320, 322, 324, 326, 340, 330, and/or 350) a second training operation for training the machine learning model starting in a partially trained state represented in the checkpoint information generated at the last one of the plurality of additional predetermined checkpoints. In one or more implementations, performing the evaluation of the trained machine learning model may include providing evaluation data as input to the trained machine learning model to obtain an evaluation output, and comparing the evaluation output to an evaluation criteria.

In addition to information used to resume a training operation from a checkpoint set in the operation, the checkpoint information also may include performance numbers representing the performance of the machine learning model in the partially trained state. The performance numbers may include loss values determined for the training data and validation data used in the training operation. The loss values represent the performance of the machine learning model on the training data selected for the training operation. The checkpoint information for each checkpoint may include the loss and optimizer state for the checkpoint and/or metadata such as the original training parameters, and/or any other data to allow a user to user resume training from a checkpoint at a later time. In this way, the checkpoint information can be used for feature extraction in one or more implementations. As noted above and as indicated in FIG. 3 (block 358), the checkpoint information also may be used to generate an operational machine learning model in the partially trained state. New data, which may be labeled or unlabeled, may be run through the partially trained machine learning model to evaluate the performance based on the output of the model. Alternatively, the training data may be run through the partially trained machine learning model to allow a user to see the output to evaluate the performance of the model or just to demonstrate the utility of the model even though the training process has not been completed. In one or more implementations, a partially trained model represented by the checkpoint information may be deployed and/or operated in other contexts and/or at other devices.

The ability to check performance of the machine learning model at different stages of training (e.g., at optional block 358) may be beneficial in evaluating models having no objective criteria for evaluation. For example, a style transfer template may be trained to learn a style from an artistic image and apply that style to other images. The quality of the style transfer may be considered very subjective to different users and therefore the output from the model at different states of training may appeal to different users.

In the style transfer example and/or other examples, an operational machine learning model may be generated based on checkpoint information while a training operation is running and additional checkpoints are being generated. In this example, a user-selected set of data (e.g., labeled or unlabeled data) may be passed through the operational machine learning model to generate output data. The generated output data may be evaluated and stored. In this example, the evaluation of the generated output data may be used, for example, to observe how style transfer is evolving over time during a training operation. In one or more examples, the data may be unlabeled data or may be labeled data (e.g., for performing a mathematical evaluation of the accuracy of the generated output data and/or for performing a supervised task).

FIG. 4 is a flowchart illustrating resuming a training operation for training a machine learning model (e.g., after a prior training operation has been completed, paused, cancelled, or otherwise interrupted) according to aspects of the subject technology. For explanatory purposes, the blocks of the process are described herein as occurring in serial, or linearly. However, multiple blocks of the process may occur in parallel. In addition, the blocks of the process need not be performed in the order shown and/or one or more blocks of the process need not be performed and/or can be replaced by other operations.

In the example of FIG. 4, at block 402, first checkpoint information may be stored, in a non-volatile storage medium, the first checkpoint information including a representation of a machine learning model in a first partially trained state corresponding to a first predetermined checkpoint during a first training operation for the machine learning model.

At block 404, the first checkpoint information may be loaded from the non-volatile storage medium. In one or more implementations, the first checkpoint information may also include loss values for the first set of training data determined at a checkpoint that occurred prior to the first predetermined checkpoint in the same training operation or in a previous training operation (e.g., determined at a last training iteration before the first predetermined checkpoint). In one or more implementations, the first checkpoint information includes a representation (e.g., a matrix representation) of the machine learning model in the first partially trained state, feature vectors generated from training data used in the first training operation of the machine learning model, and weight values (e.g., in a tensor of weight values) of the machine learning model in the first partially trained state At block 406, a second training operation may be initiated for training the machine learning model starting in the first partially trained state using the stored first checkpoint information. In one or more implementations, the first training operation includes a first number of training iterations, and the first predetermined checkpoint is set at a point after a second number of training iterations has been completed, and the second number of training iterations is less than the first number of training iterations.

In one or more implementations, at a second predetermined checkpoint during the second training operation, second checkpoint information may be generated, the second checkpoint information including a representation of the machine learning model in a second partially trained state. The second checkpoint information may also be stored in the non-volatile storage medium. The second training operation for training the machine learning model can continue after the second predetermined checkpoint. In one or more implementations, the second checkpoint may include loss values for the second set of training data determined in a last training iteration before the second predetermined checkpoint.

In one or more implementations, the first training operation for training the machine learning model uses a first set of training data and the second training operation for training the machine learning model uses a second set of training data. The second set of training data may be the same as, or different from, the first set of training data in various implementations.

In one or more implementations, an operational machine learning model may be generated (see, e.g., block 358 of FIG. 3) based on the first checkpoint information. A user-selected set of data (e.g., labeled data or unlabeled data) may be passed through the operational machine learning model to generate output data, and the output data may be stored in the non-volatile storage medium.

Figure 5:
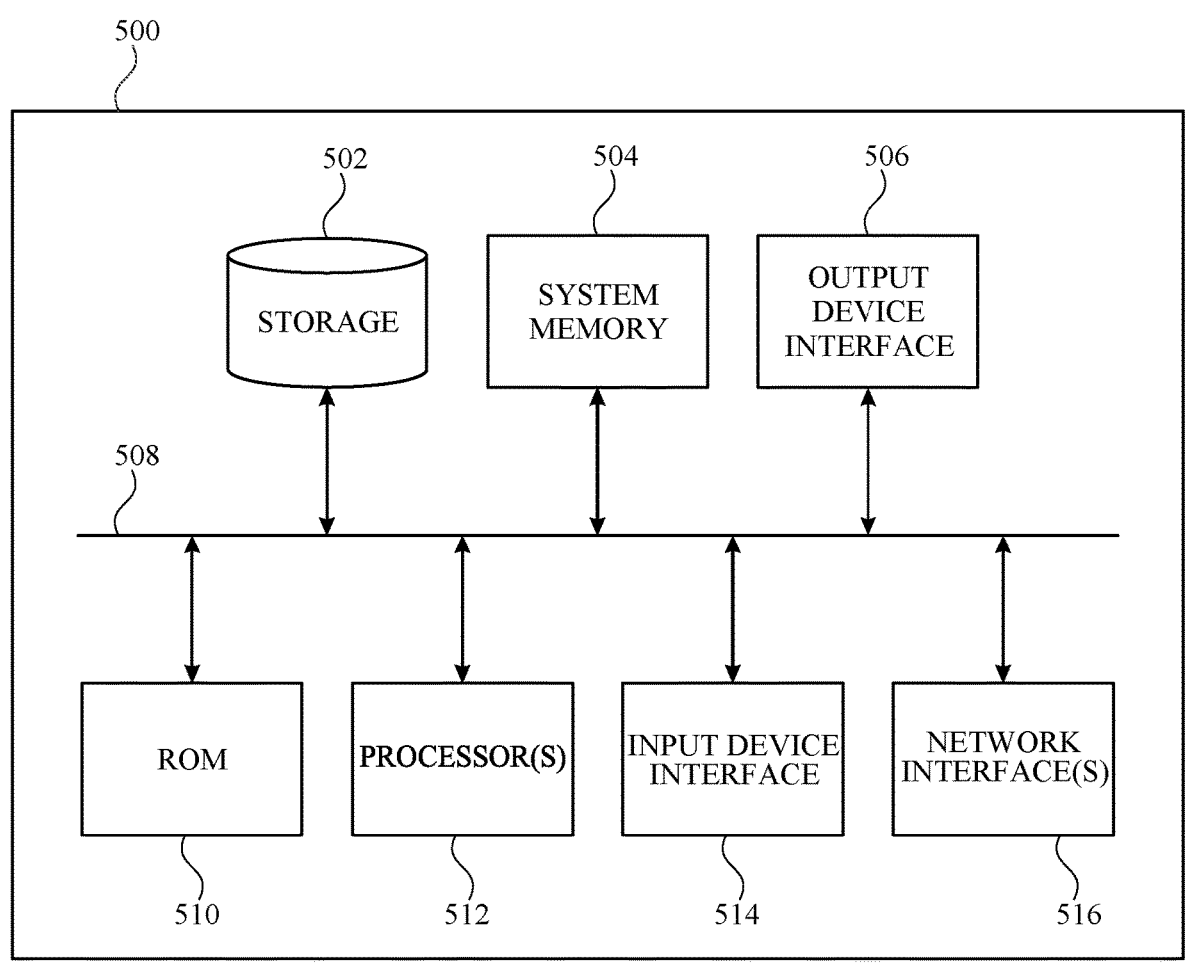
FIG. 5 illustrates an example of a computer system with which aspects of the subject technology may be implemented.

FIG. 5 illustrates an electronic system 500 with which one or more implementations of the subject technology may be implemented. The electronic system 500 can be, and/or can be a part of, server 110 and/or computing device 120 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the computing device 120 shown in FIG. 1, through the one or more network interface (s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized as computer program products comprising code in a tangible computer-readable storage medium (or multiple tangible computer-readable storage media of one or more types) encoding one or more instructions of the code. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or segmented in a different way) all without departing from the scope of the subject technology.

Aspects of the present technology may include the gathering and use of data available from specific and legitimate sources to train machine learning models and to apply to trained machine learning models deployed in systems. The present disclosure contemplates that in some instances, this gathered data may include personal information data that uniquely identifies or can be used to identify a specific person. Such personal information data can include metadata or other data associated with images that may include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to train a machine learning model for better performance. Accordingly, use of such personal information data enables users to have greater control of the delivered content. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of training data collection, the present technology can be configured to allow users to select to "opt in" or "opt out" of participation in the collection of personal information data during registration for services or anytime thereafter. In another example, users can select not to provide mood-associated data for use as training data. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, training data can be selected based on aggregated non-personal information data or a bare minimum amount of personal information, such as the content being handled only on the user's device or other non-personal information available to as training data.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
initiating a first training operation for training a machine learning model;
at a first predetermined checkpoint during the first training operation, generating first checkpoint information comprising a representation of the machine learning model in a first partially trained state and feature vectors generated from training data used in the first training operation of the machine learning model;
at a second dynamic checkpoint during the first training operation, generating second checkpoint information comprising a representation of the machine learning model in a second partially trained state, wherein the second dynamic checkpoint is based at least in part on a change in a loss function measured after a most recent training iteration and is generated upon determining, after the most recent training iteration, that a metric for the change in the loss function is satisfied;
storing the first checkpoint information and storing the second checkpoint information in a non-volatile storage medium; and
continuing the first training operation for training the machine learning model after the first predetermined checkpoint and after the second dynamic checkpoint.

2. The method of claim 1, wherein the first training operation comprises a first number of training iterations, and wherein the first predetermined checkpoint is set at a point after a second number of training iterations has been completed, wherein the second number of training iterations is less than the first number of training iterations.

3. The method of claim 2, further comprising:
pausing or cancelling the first training operation;
loading the first checkpoint information or the second checkpoint information from the non-volatile storage medium; and
initiating a second training operation for training the machine learning model starting in the first partially trained state or the second partially trained state using the stored first checkpoint information or the stored second checkpoint information, respectively, respectfully, the second training operation comprising additional training iterations.

4. The method of claim 3, further comprising:
at a third predetermined checkpoint during the second training operation, generating third checkpoint information comprising a representation of the machine learning model in a third partially trained state, wherein the additional training iterations of the second training operation correspond to training iterations remaining from the first number of training iterations after the second number of training iterations are completed;
storing the third checkpoint information in the non-volatile storage medium; and
continuing the second training operation for training the machine learning model after the third predetermined checkpoint.

5. The method of claim 4, wherein the first training operation for training the machine learning model uses a first set of training data and the second training operation for training the machine learning model uses a second set of training data different from the first set of training data.

6. The method of claim 5, wherein the first checkpoint information further comprises loss values for the first set of training data determined in a last training iteration before the first predetermined checkpoint and the third checkpoint information further comprises loss values for the second set of training data determined in a last training iteration before the third predetermined checkpoint.

7. The method of claim 1, further comprising:
generating and storing checkpoint information at a plurality of additional predetermined or dynamic checkpoints during the first training operation;
completing the first training operation;
performing an evaluation of a trained machine learning model generated by the completion of the first training operation;
obtaining, based on the evaluation, the checkpoint information generated at a last one of the plurality of additional predetermined or dynamic checkpoints; and
initiating a second training operation for training the machine learning model starting in a partially trained state represented in the checkpoint information generated at the last one of the plurality of additional predetermined or dynamic checkpoints.

8. The method of claim 7, wherein completing the first training operation comprises completing a predetermined number of training iterations or achieving a predetermined accuracy.

9. The method of claim 8, wherein performing the evaluation of the trained machine learning model comprises providing evaluation data as input to the trained machine learning model to obtain an evaluation output, and comparing the evaluation output to an evaluation criteria.

10. The method of claim 1, further comprising:
generating an operational machine learning model based on the first checkpoint information or the second checkpoint information;
passing a user-selected set of data through the operational machine learning model to generate output data; and
storing the output data in the non-volatile storage medium.

11. The method of claim 1, wherein the first checkpoint information comprises a matrix representation of the machine learning model in the first partially trained state, and a first tensor comprising weight values of the machine learning model in the first partially trained state, and wherein the second checkpoint information comprises a matrix representation of the machine learning model in the second partially trained state, feature vectors generated from training data used in the first training operation of the machine learning model, and a second tensor comprising weight values of the machine learning model in the second partially trained state.

12. A system, comprising:
a processor; and
a memory device containing instructions which, when executed by the processor, cause the processor to:
store, in a non-volatile storage medium, first checkpoint information comprising:
a representation of a machine learning model in a first partially trained state corresponding to a first predetermined checkpoint during a first training operation for the machine learning model, and feature vectors generated from training data used in the first training operation of the machine learning model;

store, in the non-volatile storage medium, second checkpoint information comprising:

a representation of the machine learning model in a second partially trained state corresponding to a second dynamic checkpoint during the first training operation for the machine learning model, wherein the second dynamic checkpoint is based at least in part on a change in a loss function measured after a most recent training iteration of the first training operation and is generated upon determining, after the most recent training iteration, that a metric for the change in the loss function is satisfied;

load the first checkpoint information or the second checkpoint information from the non-volatile storage medium; and initiate a second training operation for training the machine learning model starting in the first partially trained state or the second partially trained state using the loaded first checkpoint information or loaded second checkpoint information, respectively.

13. The system of claim 12, wherein the instructions, when executed by the processor, further cause the processor to perform the first training operation, wherein the first training operation comprises a first number of training iterations, and wherein the first predetermined checkpoint is set at a point after a second number of training iterations has been completed, wherein the second number of training iterations is less than the first number of training iterations.

14. The system of claim 12, wherein the instructions, when executed by the processor, further cause the processor to:

at a third predetermined checkpoint during the second training operation, generate third checkpoint information comprising a representation of the machine learning model in a third partially trained state;

store the third checkpoint information in the non-volatile storage medium; and continue the second training operation for training the machine learning model after the third predetermined checkpoint.

15. The system of claim 14, wherein the first training operation for training the machine learning model uses a first set of training data and the second training operation for training the machine learning model uses a second set of training data different from the first set of training data.

16. The system of claim 15, wherein the first checkpoint information further comprises loss values for the first set of training data determined in a last training iteration before the first predetermined checkpoint and the third checkpoint information further comprises loss values for the second set of training data determined in a last training iteration before the third predetermined checkpoint.

17. The system of claim 12, wherein the instructions, when executed by the processor, further cause the processor to:

generate an operational machine learning model based on the first checkpoint information or the second checkpoint information;

pass a user-selected set of data through the operational machine learning model to generate output data; and store the output data in the non-volatile storage medium.

18. The system of claim 12, wherein the first checkpoint information comprises a matrix representation of the machine learning model in the first partially trained state, and a first tensor comprising weight values of the machine learning model in the first partially trained state, and wherein the second checkpoint information comprises a matrix representation of the machine learning model in the second partially trained state, feature vectors generated from training data used in the first training operation of the machine learning model, and a second tensor comprising weight values of the machine learning model in the second partially trained state.

19. A computer program product comprising code stored in a non-transitory tangible computer-readable storage medium, the code comprising:

code for initiating a first training operation for training a machine learning model;

code for, at a first predetermined checkpoint during the first training operation, generating first checkpoint information comprising a representation of the machine learning model in a first partially trained state and feature vectors generated from training data used in the first training operation of the machine learning model;

code for storing the first checkpoint information in a non-volatile storage medium;

code for continuing the first training operation for training the machine learning model after the first predetermined checkpoint;

code for, at a second dynamic checkpoint during the first training operation, generating second checkpoint information comprising a representation of the machine learning model in a second partially trained state, wherein the second dynamic checkpoint is based at least in part on a change in a loss function measured after a most recent training iteration and is generated upon determining, after the most recent training iteration, that a metric for the change in the loss function is satisfied;

code for storing the second checkpoint information in the non-volatile storage medium; and code for continuing the first training operation for training the machine learning model after the second dynamic checkpoint.

20. The computer program product of claim 19, wherein the computer program product further comprises:

code for pausing or cancelling the first training operation;

code for loading the first checkpoint information or the second checkpoint information from the non-volatile storage medium; and code for initiating a second training operation for training the machine learning model starting in the first partially trained state using the loaded first checkpoint information or second checkpoint information.

21. The computer program product of claim 20, wherein the first training operation for training the machine learning model uses a first set of training data and the second training operation for training the machine learning model uses a second set of training data different from the first set of training data.

22. The computer program product of claim 19, wherein the computer program product further comprises:

code for generating an operational machine learning model based on the first checkpoint information or the second checkpoint information;

code for passing a user-selected set of data through the operational machine learning model to generate output data; and

code for storing the output data in the non-volatile storage medium.

23. The computer program product of claim 19, wherein the first checkpoint information comprises a matrix representation of the machine learning model in the first partially trained state, and a first tensor comprising weight values of the machine learning model in the first partially trained state, and wherein the second checkpoint information comprises a matrix representation of the machine learning model in the second partially trained state, feature vectors generated from training data used in the first training operation of the machine learning model, and a second tensor comprising weight values of the machine learning model in the second partially trained state.

* * * * *